(12) United States Patent
Shapovalov et al.

(10) Patent No.: US 7,682,419 B2
(45) Date of Patent: Mar. 23, 2010

(54) METHOD FOR PROCESSING SULFIDE MINERALS AND CONCENTRATES

(76) Inventors: Viatcheslav Dmitrievich Shapovalov, ul. Shibankova, 27-37, Naro-Fominsk, Moskovskaya obl, 143300 (RU); Konstantin Sergeevich Fokin, ul. Povarskaya 22-4, Moscow 121069 (RU); Aleksandr Nikolaevich Shokhin, 1-Truzhennikov per. 17-29, Moscow 103009 (RU)

( * ) Notice: Subject to any disclaimer, the term of this patent is extended or adjusted under 35 U.S.C. 154(b) by 612 days.

(21) Appl. No.: 10/540,662

(22) PCT Filed: Apr. 16, 2003

(86) PCT No.: PCT/RU03/00170

§ 371 (c)(1),
(2), (4) Date: Jun. 23, 2005

(87) PCT Pub. No.: WO2004/092425

PCT Pub. Date: Oct. 28, 2004

(65) Prior Publication Data

US 2006/0144192 A1 Jul. 6, 2006

(51) Int. Cl.
*C21B 15/00* (2006.01)
*C22B 15/00* (2006.01)

(52) U.S. Cl. ....................................................... 75/743

(58) Field of Classification Search .................... 75/343, 75/351, 370–374, 392, 710–745; 423/1–209, 423/658.5
See application file for complete search history.

(56) References Cited

U.S. PATENT DOCUMENTS 2,315,988 A * 4/1943 Somers et al. ............... 423/523

3,793,429 A 2/1974 Queneau et al.
4,132,758 A * 1/1979 Frankiewicz et al. .......... 423/27

(Continued)

FOREIGN PATENT DOCUMENTS

SU 681107 8/1979

(Continued)

OTHER PUBLICATIONS

Pashkov, G. et al. Effect of potential and ferric ions on lead sulfide dissolution in nitric acid. Hydrometallurgy, Feb. 2002, pp. 171-179, vol. 63, No. 2, Elsevier Scientific Publishing Cy, Amsterdam, Netherlands.

*Primary Examiner*—George Wyszomierski
*Assistant Examiner*—Vanessa Velasquez
(74) *Attorney, Agent, or Firm*—Houston Eliseeva LLP

(57) ABSTRACT

Recovery of nonferrous, rare and precious metals from sulfide minerals and concentrates is described. The hydrometallurgical method of sulfide minerals and concentrates processing, involving sulfide minerals oxidation in aqueous medium using nitrogen oxides, provides that the sulfide materials containing slurry are subjected to oxidation of the sulfide which is realized under controlled conditions of the slurry acidity. Constant neutralization of sulfuric acid formed as a result of the sulfides oxidation is provided. The sulfuric acid is neutralized to acidity level, at which no formation of elementary sulfur occurs, while natural or artificial substances, such as $CaCO_3$, $MgCO_3$, $Ca(OH)_2$, CaO, NaOH, $CaHPO_4$ etc., are used as acidity neutralizers. Oxidation of sulfide minerals is realized under agitation. Oxidation is realized in the range of 20-90° C., mainly in the range of 65-85° C. The liquid-to-solid ratio varies from 1:1 to 5:1, depending on effectiveness of the required precipitate formation and proceeding of the oxidation.

9 Claims, 1 Drawing Sheet

U.S. PATENT DOCUMENTS

Figure 1:
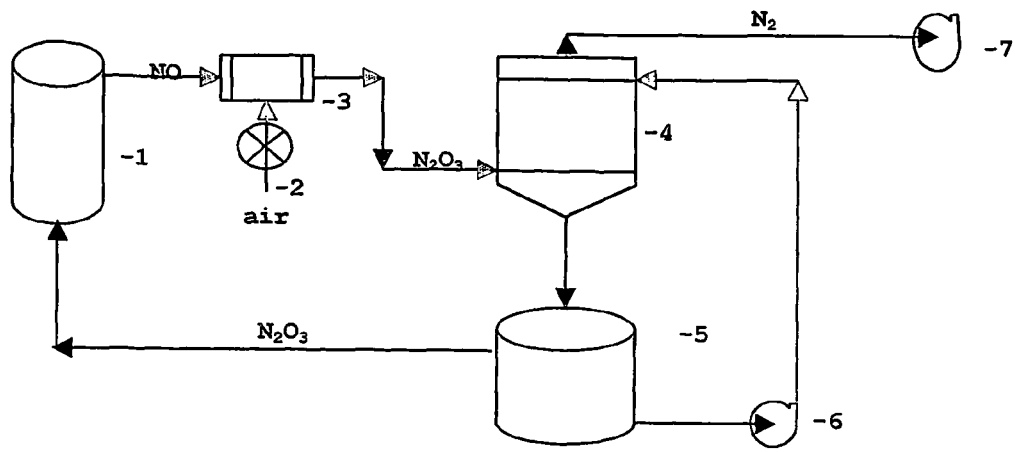

| | | | |
|---|---|---|---|
| 4,155,989 A * | 5/1979 | Miller | 423/523 |
| 4,450,188 A * | 5/1984 | Kawasumi | 427/217 |
| 4,626,417 A | 12/1986 | Young | |
| 4,647,307 A * | 3/1987 | Raudsepp et al. | 423/3 |
| 4,670,051 A * | 6/1987 | Schneider | 423/20 |
| 4,798,813 A * | 1/1989 | Kato et al. | 502/60 |
| 4,834,793 A * | 5/1989 | Schneider et al. | 75/743 |
| 4,999,173 A * | 3/1991 | Kamiyama et al. | 423/239.2 |
| 5,158,582 A | 10/1992 | Onitsuka et al. | |
| 5,236,492 A * | 8/1993 | Shaw et al. | 75/744 |
| 5,425,800 A | 6/1995 | Buter et al. | |
| 6,264,909 B1 | 7/2001 | Drinkard, Jr. | |
| 2002/0098345 A1 * | 7/2002 | Kamo et al. | 428/336 |

FOREIGN PATENT DOCUMENTS

| | | | |
|---|---|---|---|
| WO | WO 94/17216 | * | 8/1994 |
| WO | WO9417216 | | 8/1994 |
| WO | WO9711202 | | 3/1997 |
| WO | WO 01 87464 | | 11/2001 |

\* cited by examiner

METHOD FOR PROCESSING SULFIDE MINERALS AND CONCENTRATES

The method is referred to hydrometallurgical process and serves for recovery of nonferrous, rare and precious metals from sulfide minerals and concentrates.

The practice of sulfide ores processing is based on the fact that essential amounts of nonferrous, rare and precious metals are constituents of the sulfide mineral structure and cannot be extracted without oxidation of the sulfides. Rich ores are processed by direct oxidation, while gravity- and flotation concentrates are usually obtained from poor ores, major amount of sulfide minerals transferring to the concentrates.

The known methods for oxidation of sulfide ores and concentrates, like roasting, pressurized autoclave oxidation, nitric acid oxidation, bacterial oxidation, etc. have significant shortcomings, which hamper their extensive use in current industrial practice.

The known method of hydrometallurgical recovery of metals from ores, which is described in PCT application No. 94/17216, Int. Cl..: C22B 3/44, 3/06, 3/08, 3/00, 15/00, Publication Date Apr. 8, 1994, has much in common with the invention proposed and consists in oxidation of sulfide minerals by nitric acid. Oxidation of sulfide minerals with concentrated nitric acid gives rise to nitric acid thermal decomposition effect catalyzed by transition metal cations transferred into solution from the concentrate. It results in the necessity to spend 3-6 weight amounts of acid of theoretically required one, which makes the oxidation unfit for economic reasons. Besides, after the concentrates oxidation with nitric acid the solution contains a great amount of nitrates, which impedes their safe discharge to the environment.

There are well-known processes reducing consumption of nitric acid for concentrates oxidation due to feed of pure oxygen to the oxidation reactor to convert nitrogen oxides into regenerated nitric acid directly in the reactor. One of the processes is described in the PCT application No. 97/11202, Int. Cl.: C22B 3/06, 11/00, Publication Date: 27 Mar. 1997. However, the processes due to thermodynamic reasons involve oxidation of a portion of sulfide sulfur to elementary sulfur, which shields the surface of gold and other precious metals and deteriorates their further recovery.

One feature in common between the Prior Art and technical approach proposed consists in the stage of sulfide mineral oxidation by nitric acid. The action of nitric acid brings about transfer of metal into solution, which facilitates its recovery.

The technical approach proposed describes the process, which permits:

1. Oxidation of sulfide minerals contained in ores and concentrates for subsequent, as complete as practicable, recovery of nonferrous, rare and precious metals (using the well-known techniques),
2. Oxidation of sulfide minerals that occurs under conditions ruling out formation of elementary sulfur with simultaneous hydrolysis of trivalent iron into compounds binding arsenic into water-insoluble form,
3. Using nitrogen oxides as a catalyst of sulfides oxidation, moreover, the regeneration of nitrogen oxides from lower valence forms into higher ones is realized using either air or oxygen,
4. Using nitrogen compounds, which are catalysts of sulfide oxidation, in the most active form, i.e. as nitrous acid and its oxides.

The invention is aimed at creating conditions for the most complete extraction of metals, preventing formation of elementary sulfur.

The objective is attained by means of the following: the hydrometallurgical method of sulfide minerals and concentrates processing, which involves sulfide minerals oxidation in aqueous medium using nitrogen oxides, envisages that the sulfide materials containing slurry are subjected to oxidation of the sulfide and the oxidation is realized under controlled conditions of the slurry acidity, i.e. with constant neutralization of sulfuric acid formed as a result of the sulfides oxidation, moreover, sulfuric acid is neutralized to acidity level, at which no formation of elementary sulfur occurs, while natural or artificial substances, such as $CaCO_3$, $MgCO_3$, $Ca(OH)_2$, $CaO$, $NaOH$, $CaHPO_4$ etc., are used as acidity neutralizers; the choice of a specific neutralizer is dictated by the necessity of formation of slurry neutralization products with assigned physicochemical properties: filterability, slurry thickening, arsenic substance insolubility, non-toxicity and other required properties. Oxidation of sulfide minerals is realized under agitation providing sufficient mass exchange and efficient occurrence of chemical reactions. Oxidation is realized in the temperature range of 20-90° C., mainly in the range of 65-85° C. The required temperature is maintained by removal of heat released during sulfides oxidation from the oxidation reactors. The liquid-to-solid ratio may vary from 1:1 to 5:1, depending on the effectiveness of the required precipitate formation and proceeding of sulfide oxidation reactions. Nitric and nitrous acids, as well as their oxides, mainly nitrous acid, $HNO_2$, and its oxide, $N_2O_3$, are used as oxidizing agents in this patent application. Air or oxygen is used for regeneration of nitrogen oxides from NO to $N_2O_3$. Absorption of nitrogen oxides for their separation from the air inert nitrogen is realized by sulfur acid solutions, their prevailing concentration 75-98%. Sulfuric acid denitration is realized both thermally by heating mainly to a temperature not exceeding 250° C., and chemically, i.e. by introduction of denitrating substances, like alcohols, formaldehyde and other chemical reducing agents. Absorption of nitrogen oxides for their separation from inert nitrogen in the air is realized in agreement, using monovalent copper salt solutions. Denitration of the monovalent copper salt solutions is realized by dosed supply of compressed air, possibly with simultaneous heating of the solution. Monovalent copper solutions may contain stabilizing agents impeding copper oxidation from monovalent to bivalent one, as bivalent copper solutions are not effective solvents of NO. The well-known substances, namely tributyl phosphate and adipodinitrile, as well as reducing agents like formaldehyde, hydrazine, etc. can be used as stabilizing agents. Nitrogen oxide regeneration process involving NO oxidation by pure oxygen is realized at a temperature of 15-25° C. in individual regeneration oxidizer, which permits converting NO into $N_2O_3$ and preventing nitric acid accumulation in the slurry.

Figure 2:
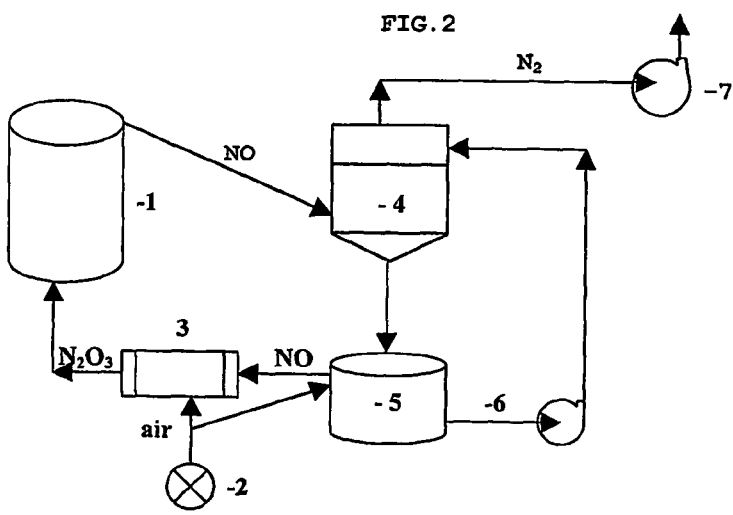
Figure 3:
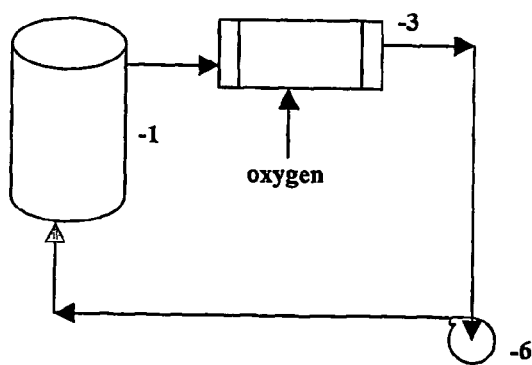

The flowsheets illustrated in FIG. 1-3 are provided for clarifying the essence of the technical approach proposed. The flowsheet in FIG. 1 depicts schematically the hardware for oxidation of sulfide ores and concentrates with nitrogen oxides regeneration by air and absorption by sulfuric acid, where:

1—sulfide ores and concentrates oxidation reactor
2—blower
3—oxidizer
4—absorber
5—denitrator
6—pump
7—fan.

Flowsheet in FIG. 2 depicts schematically the hardware for oxidation of sulfide ores and concentrates with absorption of nitric oxide by copper salts and regeneration with air, where:
1—sulfide ores and concentrates oxidation reactor
2—blower
3—oxidizer
4—absorber
5—denitrator
6—pump
7—fan.

Flowsheet in FIG. 3 depicts schematically the hardware for oxidation of sulfide ores and concentrates with regeneration of nitrogen oxides with oxygen, where:
1—sulfide ores and concentrates oxidation reactor
3—oxidizer
6—pump.

DESCRIPTION OF THE TECHNOLOGICAL PROCESS

The schematic hardware block diagram for oxidation of sulfide ores and concentrates with nitrogen oxides regeneration by air and absorption by sulfuric acid is provided in FIG. 1. Oxidation of sulfide minerals takes place in reactor 1 equipped with a slurry stirring device. Gases from the reactor top section, consisting primarily of NO, enter oxidizer 3, to which from blower 2 via regulator the air enters in the amount necessary for NO oxidation to $N_2O_3$. Downstream of the oxidizer nitrous gases enter absorber 4, where nitrous gas is absorbed by sulfuric acid solution, after that nitrogen via fan 7 is released to the atmosphere, while sulfuric acid saturated with nitrous gases enters denitrator 5. In the denitrator as a result of heating and interaction with special chemical additions sulfuric acid evolves nitrous gases, absorbed by the acid in the absorber, into gaseous phase, and then the gases enter the sulfides oxidation reactor. After denitration sulfuric acid is fed by pump 6 to absorber 4 for continuing the nitrous gases absorption.

The schematic hardware block diagram for oxidation of sulfide ores and concentrates with absorption of nitric oxide by copper salts and regeneration with air is provided in FIG. 2. Oxidation of sulfide minerals takes place in reactor 1 equipped with a slurry stirring device. Gases from the reactor top section, consisting primarily of NO, enter absorber 4, where nitric oxide, NO, is absorbed by copper salt solution, after that nitrogen via fan 7 is released to the atmosphere, while copper salt solution saturated with nitric oxide, enters denitrator 5. In the denitrator as a result of NO oxidation and interaction with special chemical additions copper salt solution evolves into gaseous phase nitrogen oxide, NO, absorbed in the absorber, which enters oxidizer 3, to which air is fed from blower 2 via a regulator in the amount necessary for NO oxidation to $N_2O_3$. From oxidizer 3 nitrous gases enter the sulfides oxidation reactor.

The schematic hardware block diagram for oxidation of sulfide ores and concentrates with regeneration of nitrogen oxides by oxygen is provided in FIG. 3. Oxidation of sulfide minerals takes place in reactor 1 equipped with a slurry stirring device. Gases from the reactor top section, consisting primarily of NO, enter oxidizer 3, to which pure oxygen is fed in the amount necessary for $N_2O_3$ formation. Regenerated nitrogen oxides are fed by pump 6 to the sulfides oxidation reactor.

Oxidation of sulfide ores and concentrates is realized with observing and controlling the following conditions:

1. The slurry acidity is controlled so that the concentration of free sulfuric acid formed during sulfide sulfur oxidation in not in excess of 10-20 g/l of the slurry. It is achieved by introducing substances, which neutralize acidity, into the slurry. $CaCO_3$, $MgCO_3$, $CaO$, $Ca(OH)_2$, $CaHPO_4$, NaOH and other natural or artificial acidity neutralizers can be among the substances mentioned. When choosing a specific neutralizer, one should bear in mind the necessity to form precipitates, i.e. products of the slurry neutralization and trivalent iron hydration, featuring the assigned properties: thickening ability, filterability, insolubility of arsenic, antimony compounds, and other toxic substances contained in precipitates. The above-mentioned conditions permit oxidizing all sulfide sulfur to sulfate one without formation of the elementary form. Simultaneously arsenic, antimony and other toxic elements for the process and the environment are transferred to water-insoluble state.

2. The process of oxidation in the reactor is arranged so that nitrous acid, $HNO_2$, and its oxide, $N_2O_3$, are oxidizing agents, while the air oxygen is used for the acid and its oxide regeneration. For this purpose, gases from the sulfide concentrates oxidation reactor (FIG. 1, pos. 1) consisting largely of NO, enter the oxidizing volume (FIG. 1, pos. 3), to which the air is dosed, allowance made for gas mixture analysis, for NO oxidation to $N_2O_3$ by the reactions:

$$2NO+O_2=2NO_2$$

$$NO_2+NO=N_2O_3$$

$NO_2$ formed as a result of NO oxidation by the air oxygen at a temperature below 140° C. has a tendency towards polymerization with formation of $N_2O_4$. Accordingly, after NO mixing with oxygen in gas phase, chemical equilibrium of NO, $O_2$, $NO_2$, $N_2O_3$ and inert nitrogen of the air will set in.

The equilibrium constant of nitrogen dioxide polymerization $$2\,NO_2 = N_2O_4 + 56.8\,kJ/mol \quad Ka = \frac{P_{N2O4}}{P^2NO2}$$

in the range of low concentrations of $NO_2$ is determined by the formula:

$$Lg\,Ka = \frac{2692}{T} + 1.75\,lgT + 0.00484\,T - 7.144*10^{-6}T^2 + 3.062$$

If concentration C (vol. %) of $NO_2$>10%, the equilibrium constant is expressed by the following empirical equations:

25° C. $Ka$=0.1426–0.7588 $C_{N2O4}$

35° C. $Ka$=03183–1.591 $C_{N2O4}$

45° C. $Ka$=0.6706–3.382 $C_{N2O4}$ where $C_{N2O4}$—content of nitrogen oxides in terms of $N_2O_4$, mol/liter $$C_{N2O4} = \frac{0.5\,P_{NO2} + 2P_{N2O4}}{R*T}$$

where $P_{NO2}$ and $P_{N2O4}$—partial gas pressure, atm.

Rate constant of $N_2O_3$ formation:

$$NO + NO_2 = N_2O_3 \quad Kb = \frac{P_{N2O3}}{P_{NO} * P_{NO2}}$$

is determined by the following empirical equations:

25° C. $Kb = 2.105 - 45.63 \, C_{N2O3}$

35° C. $Kb = 3.673 - 78.11 \, C_{N2O3}$

45° C. $Kb = 6.88 - 196.4 \, C_{N2O3}$ where $C_{N2O3}$—content of NO, $NO_2$, $N_2O_4$ in terms of $N_2O_3$, mol/liter $$C_{N2O3} = 0.5 \, (P_{NO} + P_{NO2} + 2P_{N2O4}) * \frac{1}{R*T}$$

Thermodynamic calculations made for gas mixtures different in composition at various temperatures and pressures proved that it is actually impossible to select conditions permitting formation of solely $N_2O_3$. The presence of nitrogen oxides like $NO_2$ and $N_2O_4$ further gives rise to formation of nitric acid in the oxidation reaction, which is undesirable in the framework of this process.

The process of present invention permits solving the problem:

For separating nitrogen oxides formed in the oxidizer (FIG. 1, pos. 3) from atmospheric nitrogen and other inert gases contained in the gas mixture, nitrogen oxides are absorbed by sulfuric acid solution in the absorber (FIG. 1, pos. 4). During $NO_2$ nitrogen dioxide absorption by sulfuric acid the following reactions occur:

$2 \, NO_2 + H_2SO_4 = HNSO_5 + HNO_3$

Nitric acid, HNO3, formed in highly acidic medium of sulfuric acid interacts with $HNSO_5$ by the reaction:

$HNSO_5 + HNO_3 = H_2SO_4 + 2 \, NO_2$

Hence, absorption of $NO_2$ and $N_2O_4$ by sulfuric acid is inefficient, as it results in formation of the initial substances.

Absorption of nitrogen oxides in the form of $N_2O_3$ by sulfuric acid is very effective, since interaction is complete with formation of $HNSO_5$:

$N_2O_3 + H_2SO_4 = HNSO_5 + HNO_3$ $2 \, HNO_3 = H_2O + N_2O_3$

Thus, nitrogen oxides in the form of $N_2O_3$ are absorbed completely by sulfuric acid solutions.

NO solubility in sulfuric acid solution is insignificant and at a temperature of 20° C. under normal pressure it is:

| $H_2SO_4$ concentration % | 100 | 45 | 24 | 0 |
|---|---|---|---|---|
| NO content % | 0.0025 | 0.002 | 0.005 | 0.009 |

The data above suggest that when a mixture of gases consisting of NO, $NO_2$, $N_2O_3$, $N_2O_4$ and inert gases is fed to the absorber, solely $N_2O_3$ will react irreversibly with sulfuric acid. Accordingly, concentration of $N_2O_3$ will decrease and chemical reactions will takes place towards its formation. The rates of gas reactions are very high and equilibrium in the system sets in 0.1-0.5 sec, which permits absorbing nitrogen oxides in the form of $N_2O_3$ in the absorber in the course of gas residence in it.

3. To decrease the loss of nitrogen oxides with flue gases, stemming from partial pressure of nitrogen oxides above sulfuric acid, nitrous gases absorption will be realized by sulfuric acid, its concentration 75-98%. Advisability of using sulfuric acid solutions with the above-mentioned concentration limits is dictated by the degree of hydrolysis of nitrosyl sulfuric acid, $HNSO_5$, in $H_2SO_4$ solutions, and, accordingly, by pressure of nitrogen oxides over $H_2SO_4$ surface.

| $H_2SO_4$ concentration % | 98 | 95 | 92 | 90 | 87 | 80 | 70 | 57 |
|---|---|---|---|---|---|---|---|---|
| % of $HNSO_5$ hydrolysis | 1.1 | 4 | 7.3 | 12.4 | 19.4 | 27.7 | 49.8 | 100 |

4. Sulfuric acid saturated with nitrous gases enters the denitrator (FIG. 1, pos. 5), where thermal and chemical decomposition of nitrosyl sulfuric acid, $HNSO_5$, occurs with formation of the initial acid and nitrous acid, $HNO_2$. The decomposition takes place largely as a result of heating, but chemical denitrating agents, like alcohols, formaldehydes and other chemical reducing agents, can also be used for sulfuric acid denitration. High temperature (up to 250° C.) and the chemical substances give rise to nitrosyl sulfuric acid and nitrous acid decomposition with evolution of $N_2O_3$, which in its turn at this temperature provides equimolar mixture of NO and $NO_2$. The gas mixture is fed to the oxidation reactor (FIG. 1, pos. 1), where oxidation of sulfide concentrates stems from the effect of nitrous acid formed upon interaction between nitrous gases and the slurry water.

For saving high-temperature energy media, which are to be used for nitrosyl sulfuric acid heating up to 250° C., copper salt solutions can be used in the process of nitrogen oxides regeneration instead of sulfuric acid. It is a well-known fact that aqueous solutions of monovalent copper salt dissolve readily nitric oxide, NO. In the flowsheet depicted in FIG. 2 waste gases from sulfide ores and concentrates oxidation reactor (FIG. 2, pos. 1) and largely consisting of NO, are absorbed in the absorber (FIG. 2, pos. 4) by monovalent copper salt solution. Chlorides, sulfates, ammonium and other water-soluble salts of monovalent copper can be used as active compounds for nitrogen oxides absorption. Monovalent copper solution saturated with nitric oxide enters the denitrator (FIG. 2, pos. 5), to which from the blower (FIG. 2, pos. 2) compressed air is dosed, possibly with simultaneous heating of the solution. Nitric oxide, NO, is oxidized in dissolved form to $N_2O_3$, that is not absorbed by monovalent copper solution and is removed to the oxidizer (FIG. 2, pos. 3). Final correction of the degree of NO oxidation to $N_2O_3$ form occurs in the oxidizer, after that nitrous gases are fed to the oxidation reactor (FIG. 2, pos. 1).

Denitrated solution of copper salts from the denitrator (FIG. 2, pos. 5) by the pump (FIG. 2, pos. 6) is fed for the absorber (FIG. 2, pos. 4) sprinkling. Neutral nitrogen of the air, which failed to dissolve in the copper salt, is sucked out by the fan (FIG. 2, pos. 7) and is released to the atmosphere. Monovalent copper solutions may contain stabilizers preventing copper oxidation from monovalent to bivalent one, as bivalent copper solutions are not effective solvents of NO. The well-known substances like tributyl phosphate and adipodinitrile, along with other reducing agents, such as formaldehyde, hydrazine, etc., can be used as the stabilizers.

When pure oxygen is used for NO oxidation in regeneration, the hardware block diagram is much simpler, as there is no necessity to remove inert nitrogen of the air from the system. Meanwhile, implementation of a separate regeneration oxidizer (FIG. 3, pos. 3) is an essential element of our new technology, as it permits regeneration by NO converting into $N_2O_3$ and avoiding nitric acid accumulation in the slurry. Oxygen feeding directly to the oxidation reactor will give rise to parallel formation of nitric and nitrous acids, since the conditions of concentrates oxidation (65-85° C.) and conditions of nitric acid regeneration differ in temperature and pressure.

Examples of specific implementation of the method claimed:

1. Copper ore featuring the composition: pyrite—80%, chalcopyrite—4%, sphalerite and galenite—1%, quartz—7%, chlorite—2%, serecite—2%, barite, epidote—up to 1% underwent oxidation according to the hardware block diagram depicted in FIG. 1.

Chemical composition of the ore is: copper—1.54%, zinc—0.46%, sulfur—42.4%, iron—40.6%, silicon oxide—9.8%, aluminium oxide—2.4%, magnesium oxide—0.42%, calcium oxide—0.1%, potassium oxide—0.22%, sodium oxide—0.12%, gold—1.4 g/t, silver 13 g/t.

It took 4 hours to realize the oxidation process at the process temperature in the oxidation reactor of 75° C. Turnover of nitric oxide in terms of NO made up 940 grams per kg of the ore in the period of the process conduct. Temperature in the absorber (FIG. 1, pos. 4) was maintained at a level of 26° C., temperature in the denitrator (FIG. 1, pos. 5)—at a level of 130° C., ethyl alcohol in the amount of 2 ml per liter of denitrated sulfuric acid solution was used for denitration promotion. Sulfuric acid formed was neutralized by introducing of $Ca(OH)_2$ into the slurry solution to the level of residual acidity 5 g/l in terms of sulfuric acid. No formation of elementary sulfur was observed as a result of the oxidation process under controlled conditions of the slurry acidity. According to chemical analysis data the content of sulfide sulfur in the cake after the process completion made up 1.6%. Transfer of copper into solution amounted to 98.5% of the initial content in the ore, that of zinc—97% of the initial content in the ore.

The cake was cyanidated after washing and neutralization. Gold recovery made up 94%, that of silver—91% of the initial content in the ore.

2. Mixed flotation concentrate of the following composition:

copper—22.5%, zinc—3.9%, sulfide sulfur—40%, iron—32.6%, silicon oxide—0.5%, aluminium oxide—0.4%, lead—0.18%, organic carbon—0.22%, gold—10.6 g/t, silver 71.4 g/t, was subjected to oxidation according to the hardware block diagram depicted in FIG. 2.

Duration of the oxidation process made up 6 hours, at the process temperature in the oxidation reactor 80° C. Turnover of nitrogen oxide in terms of NO amounted to 1670 g/kg of ore during the period of the process. Temperature in the absorber (FIG. 1, pos. 4) was maintained at a level of 26° C., temperature in the denitrator (FIG. 1, pos. 5)—at a level of 70° C., formaldehyde in the amount of 0.7 g/liter of solution being used as copper chloride solution stabilizer. Sulfuric acid formed was neutralized by introducing solution of $Ca(OH)_2$ to the slurry to the level of residual acidity of 3 g/l in terms of sulfuric acid. As a result of the process conduct with control over the slurry acidity, no formation of elementary sulfur was observed.

According to chemical analysis data the content of sulfide sulfur in the cake after the process completion made up 2.1%. Copper transfer to solution made up 99.1% of the initial content in the ore, that of zinc—98.3% of the initial content in the ore.

After washing and neutralization the cake was cyanidated. Recovery of gold proved to be 97%, that of silver—94% of the initial content in the ore.

3. Pyrrhotine ore featuring the following composition:

pyrrhotine—67.2%, chalcopyrite—11.1%, pentlandite—9.5%, magnetite—5.7%, non-ore minerals—5.7%, titano-magnetite—0.2% was oxidized using the hardware block diagram shown in FIG. 3.

Chemical composition:

silicon oxide—1.6%, aluminium oxide—1.85%, iron—52.1%, sulfide sulfur—30.8%, calcium oxide—1.03%, magnesium oxide—0.33%, sodium oxide—0.17%, potassium oxide—0.14%, manganese oxide—0.11%, copper—3.67%, nickel—4.2%, cobalt—1310 g/t, platinum—1.5 g/t, palladium—2.2 g/t.

The oxidation process was conducted for 4.4 hours, at the process temperature in the oxidation reactor 75° C. Oxygen consumption for the ore oxidation was 340 g/kg of ore during the process. Sulfuric acid formed was neutralized by introducing solution of $Ca(OH)_2$ to residual acidity level of 7 g/l in terms of sulfuric acid, 50 g/l NaCl being added to the solution for complexing properties. As the oxidation process was conducted with control over the slurry acidity, no elementary sulfur formation was observed. According to chemical analysis data the content of sulfide sulfur in the cake after the process completion was 1.1%. Copper transfer to solution made up 94.3%, nickel—96.3%, cobalt—93.3%, platinum—91.4%, palladium—95.2 % of the initial content in the ore.

It follows from the reasoning above that the proposed hydrometallurgical method of sulfide minerals and concentrates processing differs from the known ones, therefore, the method proposed corresponds to the "novelty" criterion. Comparison of the approach proposed with the Prior Art and other technical approaches in this field of technology permitted identification of signs, which make the proposed approach different from the Prior Art, meanwhile, the differences considered are implicit, which suggests conclusion on compliance of the approach proposed with the "inventive level" criterion. The technical approach has industrial applications.

The invention claimed is:

1. A method of processing sulfide minerals and concentrates by oxidation of sulfide minerals in an aqueous medium using an oxidizing agent which is one or more of nitric acid, nitrous acid and their oxides, the method comprising:

subjecting in an oxidation reactor a slurry containing the sulfide minerals to oxidation under agitation and under controlled conditions of slurry acidity using the oxidizing agent which is one or more of nitric acid, nitrous acid and their oxides;

forming in the oxidation reactor a sulfuric acid as a result of the sulfide oxidation;

constantly neutralizing the sulfuric acid in the oxidation reactor using an acidity neutralizer to an acidity level at which no formation of elementary sulfur occurs;

removing of heat released during the sulfide oxidation from the oxidation reactor;

transferring NO from the oxidation reactor into a regeneration oxidizer;

regenerating $N_{23}$ from the transferred NO using air or oxygen in the regeneration oxidizer; and transferring the regenerated $N_2O_3$ into the oxidation reactor;

wherein the temperature in the oxidation reactor is maintained in a range from 20 to 90° C. and wherein a liquid-to-solid ratio in the slurry in the oxidation reactor is between 1:1 to 5:1.

2. The method according to claim 1 in which the acidity neutralizer is one or more of $CaCO_3$, $MgCO_3$, $Ca(OH)_2$, $CaO$, $NaOH$ and $CaHPO_4$.

3. The method according to claim 1 in which the temperature in the oxidation reactor is maintained in the range of 65-85° C.

4. The method according to claim 1, further comprising
before transferring the regenerated $N_3O_3$ into the oxidation reactor, separating the $N_2O_3$, formed in said method, from $N_2$ by absorbing the $N_2O_3$ from a mix of gases comprising $N_2$ and $N_2O_3$ into a sulfuric acid solution which has a concentration in the range 75-98%; and
releasing $N_3O_3$ from the sulfuric acid solution thermally by heating it to a temperature not exceeding 250° C., and/or chemically by introduction of a denitrating substance.

5. The method according to claim 4, in which the denitrating substance is one or more of an alcohol, formaldehyde and other chemical reducing agents.

6. The method according to claim 1, further comprising
separating the NO, formed in said method, from $N_2$ by absorbing the NO from a mix of gases comprising $N_2$ and NO into a monovalent copper salt solution;
denitrating the monovalent copper salt solution using a dosed supply of compressed air, with optional simultaneous heating of the solution.

7. The method according to claim 6 in which the monovalent copper salt solution contains a stabilizing agent to impede oxidation of copper from monovalent to bivalent.

8. The method according to claim 7 in which the stabilizing agent is one or more of tributyl phosphate, adipodinitrile, or reducing agents such as formaldehyde or hydrazine.

9. The method according to claim 1, wherein the regenerating the $N_2O_3$ from the NO formed in said method is performed using pure oxygen in an individual regeneration oxidizer and at a temperature of 15-25° C.

* * * * *